United States Patent
Gallo et al.

(10) Patent No.: US 6,760,776 B1
(45) Date of Patent: Jul. 6, 2004

(54) METHOD AND APPARATUS FOR PROCESSING NETWORK FRAMES IN A NETWORK PROCESSOR BY EMBEDDING NETWORK CONTROL INFORMATION SUCH AS ROUTING AND FILTERING INFORMATION IN EACH RECEIVED FRAME

(75) Inventors: Anthony Matteo Gallo, Apex, NC (US); Natarajan Vaidhyanathan, Durham, NC (US); Colin Beaton Verrilli, Apex, NC (US); Gail Irene Woodland, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/546,462

(22) Filed: Apr. 10, 2000

(51) Int. Cl.[7] .............................................. G06F 15/16
(52) U.S. Cl. ..................... 709/238; 709/236; 370/392; 370/466
(58) Field of Search ................................ 709/238, 236, 709/327, 227; 370/392, 446, 506, 509, 510, 469; 710/30; 714/776; 713/151

(56) References Cited

U.S. PATENT DOCUMENTS

| | | | | |
|---|---|---|---|---|
| 5,778,189 A | * | 7/1998 | Kimura et al. | 709/236 |
| 6,104,713 A | * | 8/2000 | Nagami et al. | 370/392 |
| 6,400,729 B1 | * | 6/2002 | Shimadoi et al. | 370/466 |
| 2001/0056490 A1 | * | 12/2001 | Nagami et al. | 709/227 |

OTHER PUBLICATIONS

Tanenbaum, "Computer Network" 3rd Edition, Prentice Hall PTR, 1996.*

* cited by examiner

*Primary Examiner*—Wen-Tai Lin
(74) *Attorney, Agent, or Firm*—Bracewell & Patterson LLP

(57) ABSTRACT

A method and apparatus for processing network frames by embedding control information achieves an efficient frame processing system within a network processor (NP). The layer type of the frame can be quickly determined by the layer processing components of picocode running on the NP by examining control information that is written by ingress processing layers to produce a modified frame format. The frames are routed to appropriate layer processors and processing for certain layers may be bypassed if the picocode determines that no processing is required at that layer. The frame may also be discarded completely by any of the layer processors.

16 Claims, 6 Drawing Sheets

METHOD AND APPARATUS FOR PROCESSING NETWORK FRAMES IN A NETWORK PROCESSOR BY EMBEDDING NETWORK CONTROL INFORMATION SUCH AS ROUTING AND FILTERING INFORMATION IN EACH RECEIVED FRAME

BACKGROUND OF THE INVENTION

1. Technical Field

The present invention relates in general to computer networks, and in particular, to a network processor for managing network traffic that uses an internal frame format containing layer specific control information.

2. Description of the Related Art

Computer networks have evolved to a point where switch routers are insufficient to handle complex network routing and filtering requirements. Network processors, such as the International Business Machines (IBM) Network Processor (NP) have been developed to fill this need. Utilizing a connection similar to that of a network switch, an NP provides a level of control and flexibility that surpasses that of the network switch. Parallel lookup operations can be performed on a frame, complex modifications can be performed on packets, and policies can be managed at complex levels. Multiple processors are used to achieve a very high frame processing throughput.

Instructions for managing frame routing in an NP, known as "picocode," reside in memory but are directly used by the hardware to efficiently process frames according to a fixed set of rules. The rules are entered by administration software and compiled into picocode that drives the logical engines for controlling frame routing, frame filtering and Quality of Service (QoS) requests.

The NP also provides media interfaces for connecting standard network interfaces and routing media interface frames between ports and between the media interfaces and a switch fabric. Frames received by the network processor may be of varying types. The network processor forwards L2, L3 and L4 frames. These labels are according to the Open Systems Interconnect Reference Model, developed by the International Standards Organization (ISO), wherein L2 refers to a data link layer such as Ethernet, L3 is the network layer such as Internet Protocol (IP), and L4 to a transport layer such as User Datagram Protcol (UDP) or Transmission Control Protocol (TCP).

The present disclosure provides an improved method for processing frames by embedding layer-specific control information within frames routed within the NP, so that processing may be simplified, producing a resulting increase in performance.

SUMMARY OF THE INVENTION

The objective of processing frames by embedding layer-specific control information within frames routed within a NP is achieved in a method and system for processing frames in an NP. The NP receives a frame at an input, determines a layer type of the frame and embeds appropriate control information within a modified frame. The frame is then routed to an appropriate layer processing component within the network processing system. The frames may be discarded by a layer based on filtering criteria. Layers may also be bypassed if a layer determines that one or more layer processors will not be performing processing on the frame.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
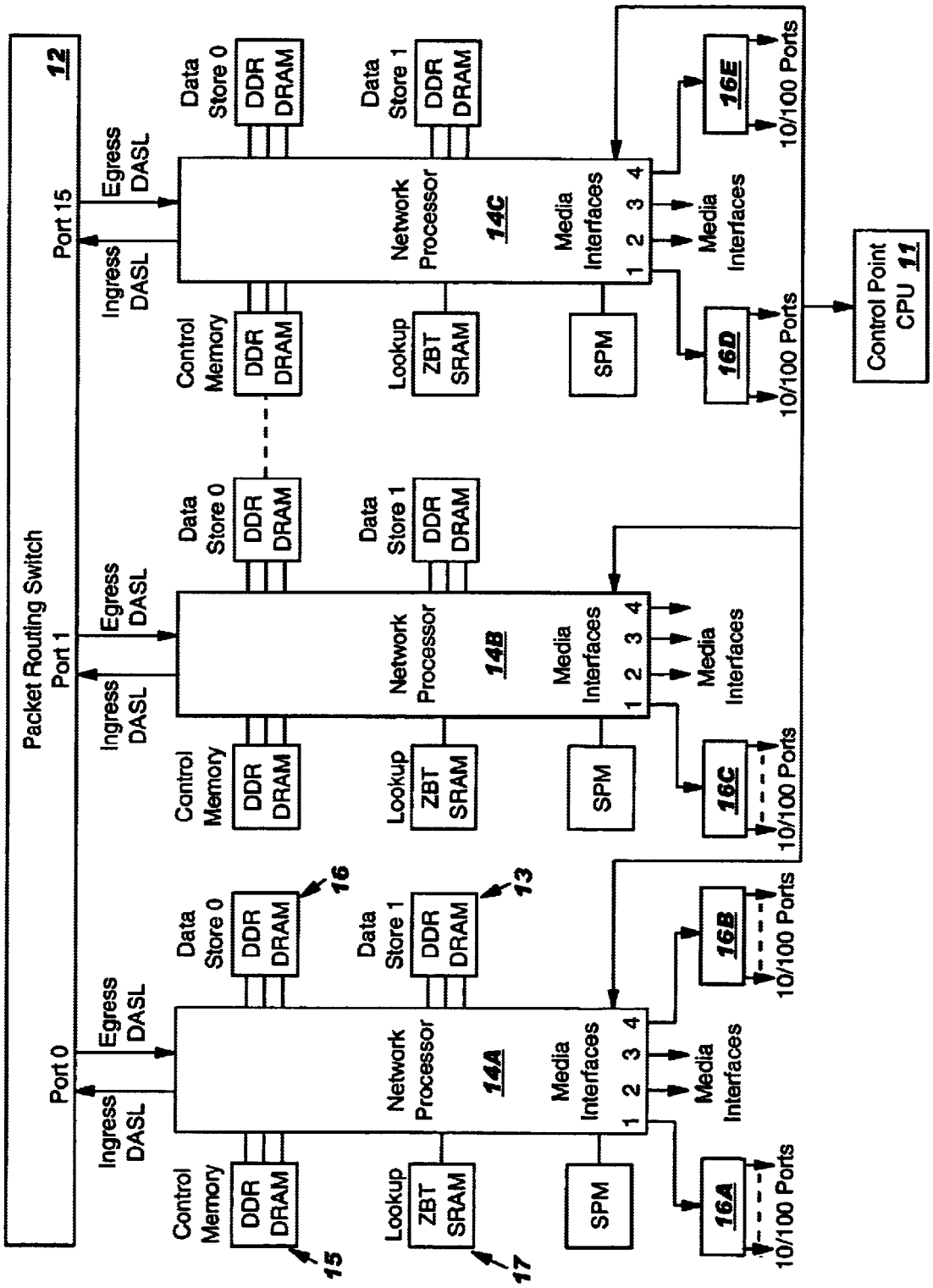
FIG. 1 is a block diagram of a network processor managed network subsystem in accordance with an embodiment of the present invention.

With reference to the figures, and in particular to FIG. 1, a network processing system in accordance with an embodiment of the present invention is depicted. A packet routing switch 12 is coupled to a group of network processors (NPs) 14A–14C. Each of NPs 14A–14C provides a media interface for connecting to networks having various protocols, such as 10 base-T or 100 base-T ethernet connections 16A–16E or other types of communication interfaces that are known in the art. Thus, NP 14A may route frames received at any of the media interfaces to port 0 on packet routing switch 12, and may perform address translations, respond to Quality-of-Service (QoS) requests, block packets, or perform any complex routing or frame processing function on the incoming frames. NP 14A via an Egress interface also receives frames from port 0 on packet routing switch 12 and may perform similar complex operations to route frames to the media interfaces. Control memory 15 provides storage for control software that drives the routing functionality and frame processing, and specifically the software managed tree (SMT) dynamic classifier of the present invention. A Lookup ZBT SRAM 17 provides fast access memory for storing the fixed match tree (FMT) hardware assisted matching of the present invention. A Control point (CP) central processing unit 11 provides management of network processor operations and downloading of applications, classifier trees and other data.

Figure 2:
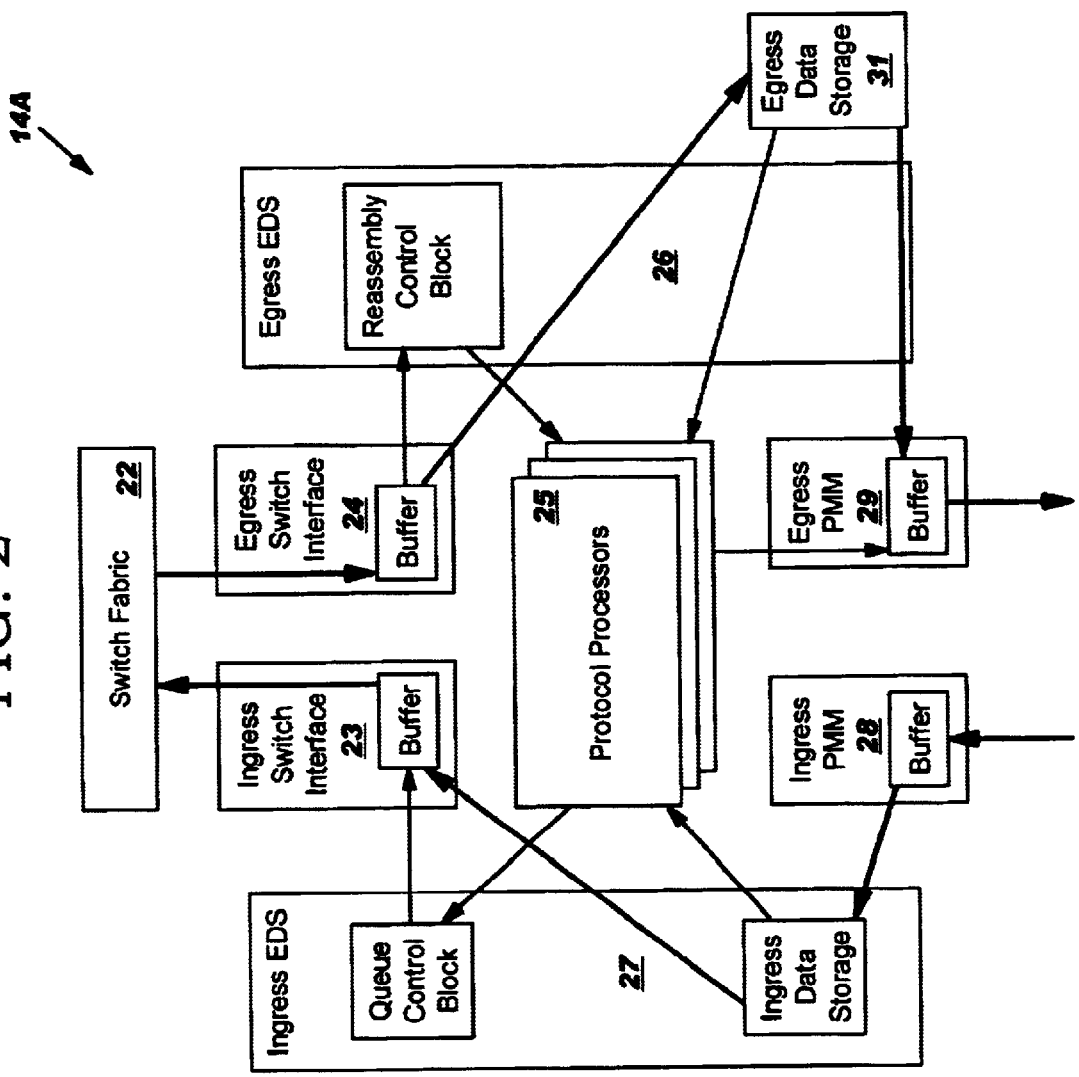
FIG. 2 is a simplified block diagram depicting frame flow within a network processor in accordance with an embodiment of the present invention.

Referring now to FIG. 2, a simplified block diagram of NP 14A is shown. An Ingress Enqueue/Dequeue/Scheduling logic (EDS) 27 manages frame buffering and control for frames routed to a switch fabric 22. Frames are received from the media interface connections by ingress physical MAC (Medium Access Control) multiplexer (PMM) 28, and are translated and processed by protocol processors 25. An ingress switch interface 23, provides a connection to switch fabric 22 and may connect to another NP or packet routing switch 12 (From FIG. 1). An egress switch interface 24 receives frame data from switch fabric 22 and the frame data is stored in an egress data storage 31. Protocol processors then can perform layer specific processing to process the frames and route them through an egress PMM 29. It is the method of processing frames through ingress PMM 28 and egress PMM 29 which the present invention concerns. Typically, frame processing has been performed by a separate processor for each layer. Bridges (providing L3 230, processing) and routers (providing L2 processing) are separate devices. The classifiers perform L4 processing, adding a third layer to the model. By using a special format for frames within the network processor, the picocode can quickly determine what type of frame is stored on a queue and perform the appropriate bridging or routing functions, including multicast transmission.

Figure 3:
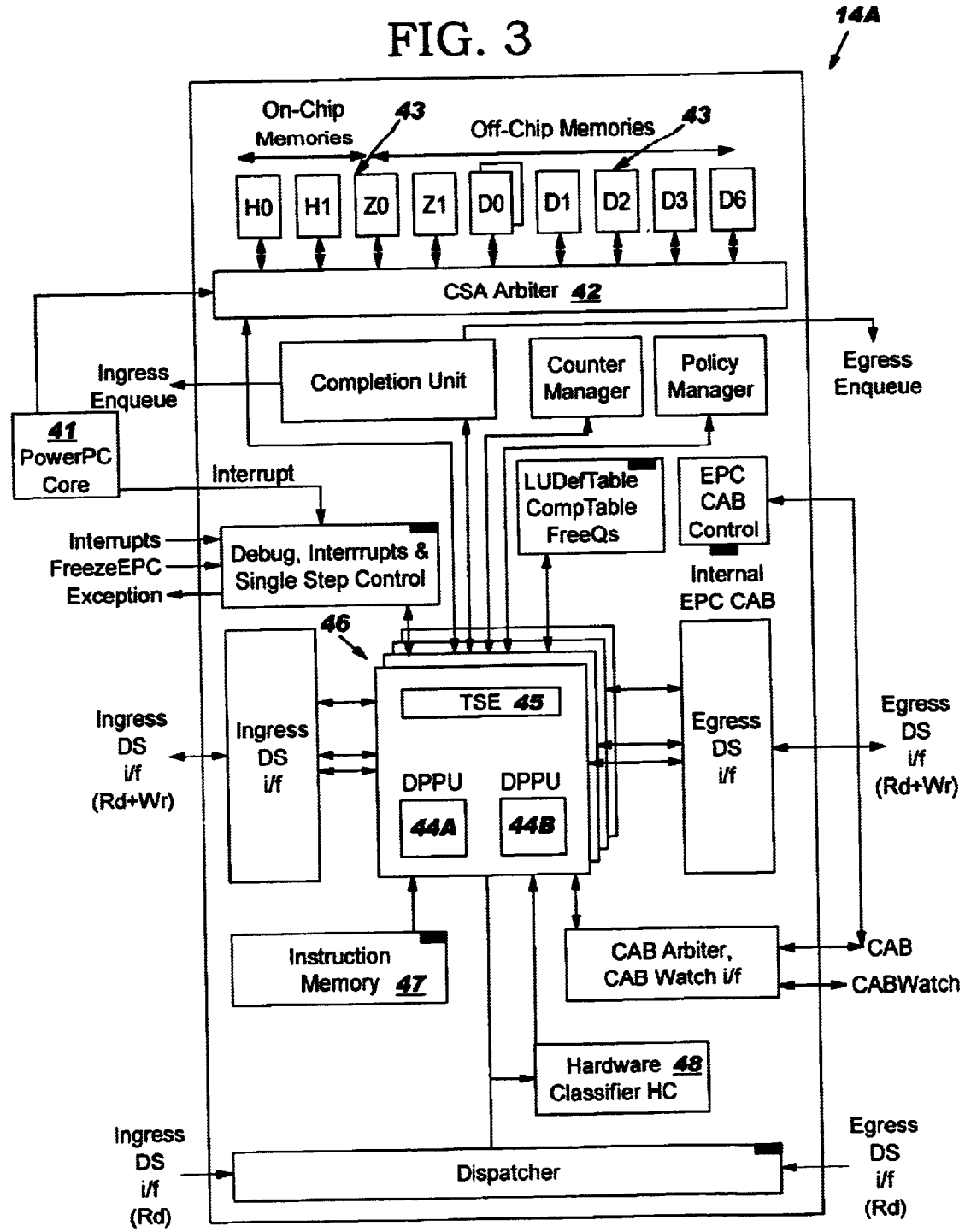
FIG. 3 is a detailed block diagram depicting a network processor in accordance with an embodiment of the present invention.

Referring now to FIG. 3, a network processor unit 40 in accordance with a preferred embodiment of the invention is depicted. Memories 43 for storing frame data, classifier trees and applications data and instructions are coupled to the NP by control store arbiter 42, allowing core processing units 46 to share access to external and internal memory. Each core processing unit 46 contains dyadic protocol processing units (DPPU) 44A–44B and a tree search engine 45. Tree search engine 45 performs L4 processing on frames entering the network processor, if L4 processing is required. An instruction memory 47 is coupled to the core processing unit 46 for storing the picocode that drives the tree search engines 45 (TSEs). Power PC® core 41, provides management of the network processor unit 40.

Software managed tree data and fixed match tree data may be downloaded into memories 43 provide control for TSEs 45 once a leaf in the tree is matched, it is loaded into internal registers in the network processor unit 40. The trees used with TSEs are referred to as static or dynamic trees. Dynamic trees are so called because they may be updated incrementally and quickly to produce. changes in the processing of frames. Static trees are not incrementally upgraded and require a reload of the tree each time the tree is modified. Static trees are useful for providing more complex matching such as applying a leaf to a range of IP addresses. Hardware classifier 48 pre-processes received frames to prepare for matching.

Figure 4:
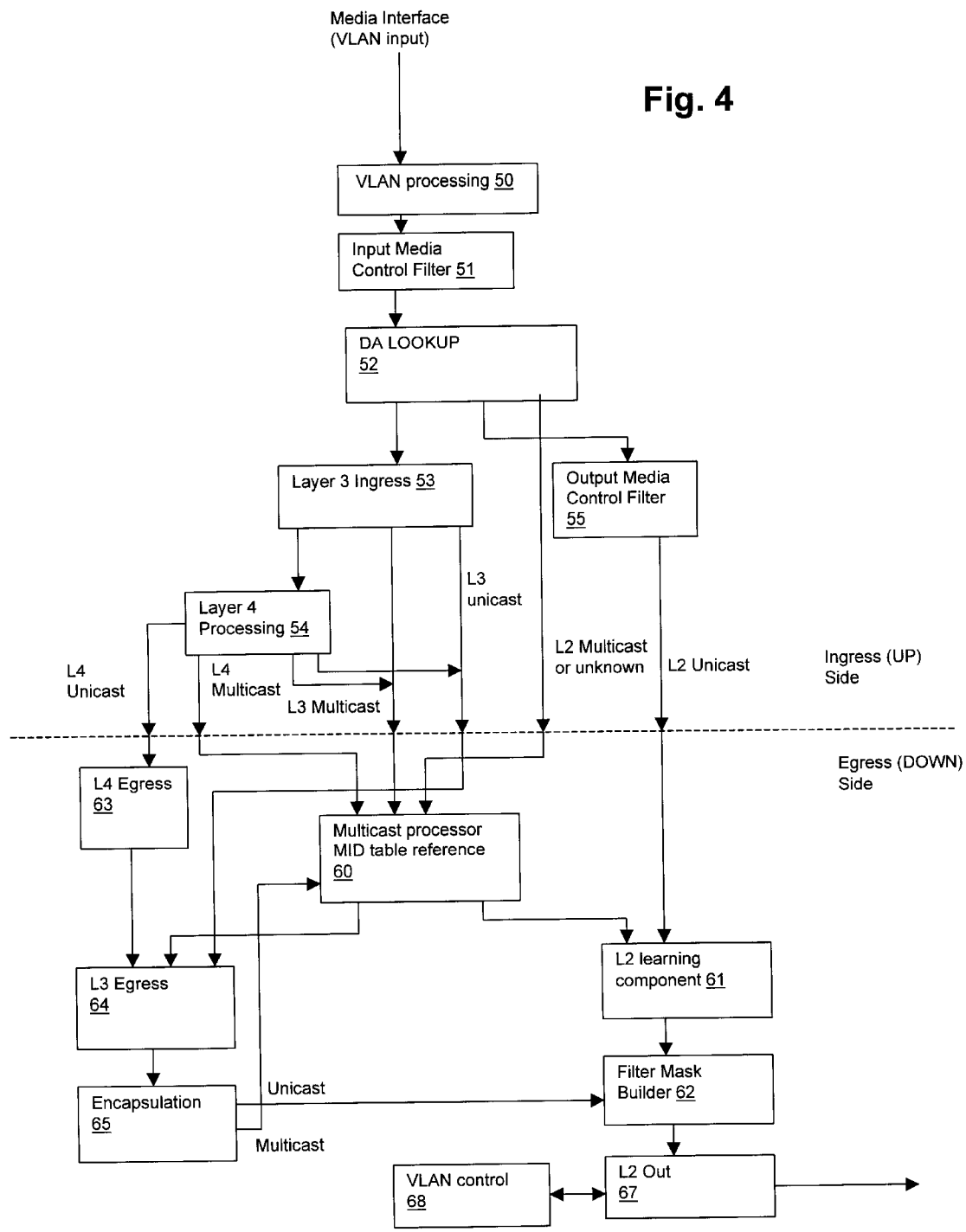
FIG. 4 is a pictorial diagram depicting dataflow within a network processing subsystem in accordance with an embodiment of the present invention.

Referring now to FIG. 4, an illustration of frame processing flow in NP 14A is depicted. A VLAN processing block 50 receives frames incoming from ingress PMM 28 and classifies them according to a configured or learned VLAN policy. An input media control filter 51 receives frames from the VLAN processing block 50 and applies policy filters on incoming frames according to a filter look-up and discards or allows frames that match the filters attributes. A destination-address lookup 52 receives frames from the media control filter 51 and determines if the L2 frame has a registered L3 address or has a multicast characteristic having an L3 registration, and if it does, the frame is passed to a layer 3 ingress processor 53. The layer 3 ingress processor 53 has a routing table that also contains a special identifier that can determine if L4 processing is required. If L4 processing is required based on an entry found in the routing table, the frame is routed to a layer 4 processing block 54. If destination-address lookup 52 did not find a registration for the frame MAC address, then if the L2 address is known (i.e. a bridging address for which the NP has a connection) then the L2 frame is routed to the output media control filter 55. The output control filter 55 may be located on the ingress NP as shown in FIG. 4, or located on the egress NP.

Those skilled in the art will recognize that this is an implementation choice based on the policy attributes being global or NP specific for output filters. The output media control filter 55 applies policy filters on outgoing frames according to a filter look-up and discards or allows frames that match the filters attributes. Frames that are allowed to pass the output media control filter attributes are routed to a L2 learning component 61. The L2 learning component 61 verifies that the source address of the frame is known. If the source address of the frame is not known the address is learned. The L2 learning component 61 then routes the frame to the filter mask builder where the list of target output ports is built for this frame. The filter mask builder 62 routes the frame to the L2 output interface 67. The L2 output interface forwards the frame from each interface specified by the output of the filter mask builder 62 with the appropriate VLAN description obtained from the VLAN control block 68. If the L2 frame is a multicast frame or has an unknown address, it is routed to the multicast processor 60.

Frame output from layer 3 ingress 53 and layer 4 processing 54 are routed to the multicast processor 60 if they have a multicast characteristic. Otherwise they are routed to the appropriate egress processors L4 egress 63 or L3 egress 64, depending on the frame type. If the multicast table reference shows a multicast destination on a local address (a VLAN served by L2 out 67), then an L2 output frame is passed to L2 learning component 61. The multicast processor is capable of handling multicast frames that are of types L2, L3 or L4. Unicast frames are passed from L3 egress 64 to an encapsulation processor 65 which builds the media frames and passes them to filter mask builder 62 for output through the L2 out 67 processing block.

The above-described flow model is made possible by the encapsulation of layer type information and other information for routing the frame in a modified packet format. For example, bytes may be added in a specific location in the modified frame to specify the layer type and other information needed to properly route the frame, such as a bridge address for L2 frames.

Figure 5:
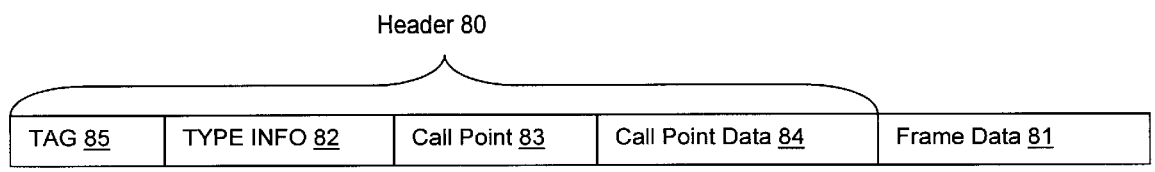
FIG. 5 is a pictorial diagram depicting a modified frame in accordance with an embodiment of the invention.

Referring now to FIG. 5, a modified frame is depicted in accordance with an embodiment of the invention. Header 80 is prefixed to frame data 81 in order to provide quick look up of frame charateristics, including layer type information. Frame type info 82 indicates whether the frame is multicast or unicast and provides the appropriate identifiers. Call point 83 indicates the application entry for processing the particular frame, including an associated target NP. Call point data 84 is information associated with the frame that the application procedure requires. Tag 85 may contain address information such as the source NP port and the source NP identifier. This modified frame format allows the various layer processors to operate on the frame header in order to accomplish routing and filtering.

Figure 6:
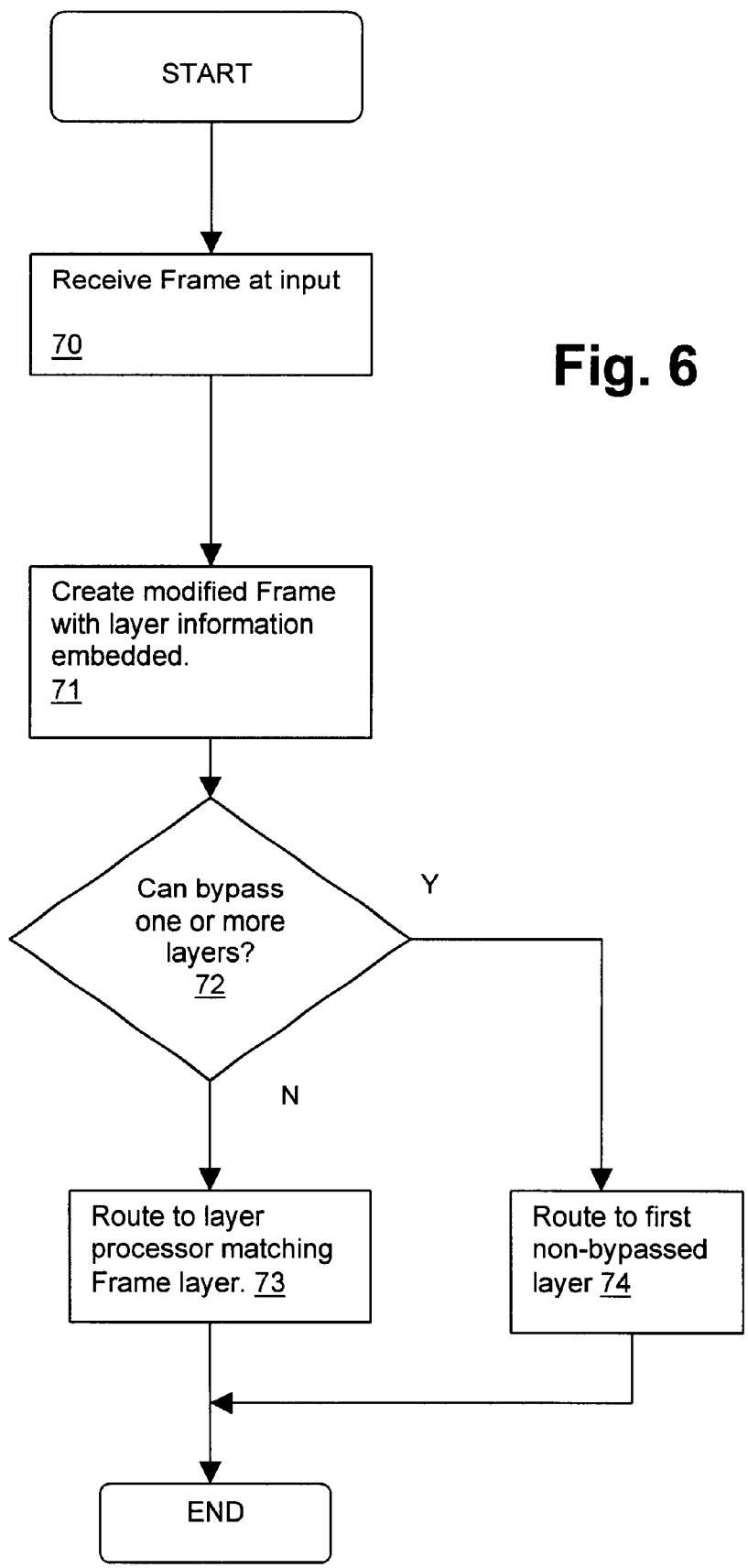
FIG. 6 is flowchart depicting a method for processing frames within a network processor managed network subsystem, in accordance with an embodiment of the present invention.

Referring now to FIG. 6, a method for processing frames in accordance with a preferred embodiment of the invention is depicted in a flowchart. A frame is received at the input an input of the NP (step 70) and a modified frame is created that contains layer information 71. If one or more layers may be bypassed (decision 72) then the frame is routed to the first non-bypassed layer (step 74), otherwise the frame is routed to the layer processor matching the frame layer (step 73).

While the invention has been particularly shown and described with reference to a preferred embodiment, it will be understood by those skilled in the art that various changes in form and detail may be made therein without departing from the spirit and scope of the invention.

What is claimed is:

1. A method for processing frames in a network processor, said method comprising:

receiving a frame at an input of said network processor;

determining a layer type of said recieved frame;

generating a modified frame by embedding control information in accordance with said determined layer type of said received frame; and routing said modified frame to a layer processing component of said network processor, wherein a layer processing type of said layer processing component matches said determined layer type of said received frame.

2. The method of claim 1, wherein said generating further includes generating a modified frame by embedding a bridge identifier within said modified frame.

3. The method of claim 1, wherein said generating further includes generating a modified frame by embedding L2 multicast information within said modified frame.

4. The method of claim 1, wherein said routing further includes discarding said modified frame.

5. The method of claim 1, wherein said routing further includes bypassing at least one L4 processing layer in response to a determination that L4 processing is not required.

6. The method of claim 1, further comprising the steps of:

processing said frame by an L3 processing layer, wherein said L3 processing layer contains an L3 routing table for routing frames; and bypassing an ingress L4 processing layer in conformance with an indication contained within said L3 routing table.

7. The method of claim 1, wherein said generating further includes generating a modified frame by embedding a queue priority within said modified frame.

8. The method of claim 1, wherein said routing is performed by a plurality of layer processors.

9. A network processor for processing frames in a network processor, said network processor comprising:

means for receiving a frame at an input of said network processor;

means for determining a layer type of said received frame;

means for generating a modified frame by embedding control information in accordance with said determined layer type of said received frame; and means for routing said modified frame to a layer processing component of said network processor, wherein a layer processing type of said layer processing component matches said determined layer type of said received frame.

10. The network processor of claim 9, wherein said generating means further includes means for generating a modified frame by embedding a bridge identifier within said modified frame.

11. The network processor for directing network communications of claim 9, wherein said generating means further includes means for generating a modified frame by embedding L2 multicast information within said modified frame.

12. The network processor of claim 9, wherein routing means further includes discarding said modified frame.

13. The network processor claim 9, wherein said routing further includes bypassing at least one L4 processing layer in response to a determination that L4 processing is not required.

14. The network processor of claim 9, further comprising means for processing said frame by an L3 processing layer, wherein said L3 processing layer contains an L3 routing table for routing frames; and means for bypassing an ingress L4 processing layer in conformance with an indication contained within said L3 routing table.

15. The network processor of claim 9, wherein generating means further includes means for generating a modified frame by embedding a queue priority within said modified frame.

16. The network processor of claim 9, wherein of said routing means is a plurality of layer processors.

* * * * *